Figure 1:
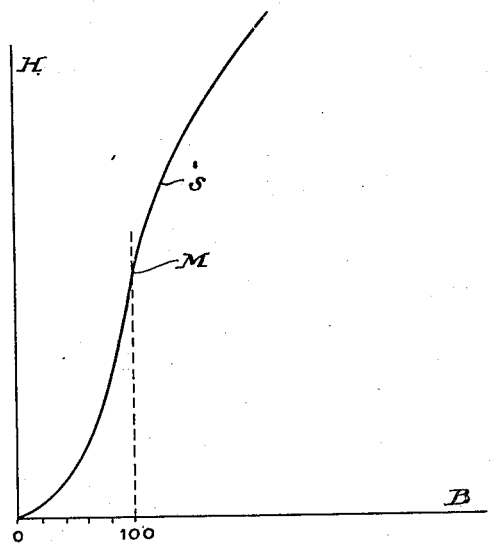

July 10, 1928.  1,676,632
C. W. BURROWS
METHOD OF AND APPARATUS FOR TESTING MAGNETIZABLE OBJECTS
Filed Jan. 4, 1924  2 Sheets-Sheet 1

INVENTOR
Charles W. Burrows
BY
ATTORNEY

July 10, 1928.

C. W. BURROWS 1,676,632

METHOD OF AND APPARATUS FOR TESTING MAGNETIZABLE OBJECTS

Filed Jan. 4, 1924    2 Sheets-Sheet 2

INVENTOR
Charles W. Burrows
BY
ATTORNEY

Patented July 10, 1928.

1,676,632

UNITED STATES PATENT OFFICE.

CHARLES W. BURROWS, OF NEW YORK, N. Y., ASSIGNOR, BY MESNE ASSIGNMENTS, TO MAGNETIC ANALYSIS CORPORATION, OF LONG ISLAND CITY, NEW YORK, A CORPORATION OF NEW YORK.

METHOD OF AND APPARATUS FOR TESTING MAGNETIZABLE OBJECTS.

Application filed January 4, 1924. Serial No. 684,368.

History.

This invention relates to improvements in methods of and apparatus for testing magnetizable objects. Experts in the art of magnetic analysis have long recognized the fact that the magnetic characteristics of a magnetizable object correspond to its physical characteristics, and that for any given set of mechanical characteristics, there is a corresponding set of magnetic characteristics.

It is upon this theory which of recent years has become recognized as a physical law, that all attempts to magnetically analyze steel or other ferrous metals have been based.

The comparative magnetic testing of the physical properties of two magnetizable objects, such as two steel bars is always based upon the assumption that the chemical properties of the specimens in question are substantially similar. Even assuming, however, that the chemical properties of the two specimens are identical, no means has heretofore been provided for commercially classifying the specimens. The principal reason for the failure to commercially classify them resides in the fact that in every case, the specimens vary in more than one physical characteristic. With the apparatus heretofore designed, it has been impossible to detect anything more than the fact that the specimens vary from each other. The extent of the variation, the factors which cause such variation, and the part which each physical difference plays in the variation have never been determined.

For purposes of illustration, we may consider the instance of two heat treated steel bars. It becomes desirable to determine magnetically whether one is up to the standard of the other in so far as "hardness" is concerned. The "hardness" of the specimen in question depends upon two physical characteristics. One is the grain structure of the specimen which depends upon the temperature at which the specimen was quenched during its heat treatment. The second is the state of internal strain, roughly termed the brittleness of the specimen, such brittleness being the result of the temperature at which the specimen was drawn. It is obviously desirable, when comparing the specimens, or testing a single specimen, to inquire specifically into each of these physical characteristics which determine the quality, known as "hardness".

No one has previously been able to make such a determination. The comparative apparatus used will indicate vaguely a difference in "hardness" and possibly a fatal variation from standard. The foundryman, however, does not know how to correct such a variation. He cannot determine magnetically whether the variation results from incorrect drawing temperature or an error in quenching temperature.

Consideration of the above facts points to the inevitable conclusion that the difference between an apparatus or a method for vaguely ascertaining a difference in "hardness", and an apparatus or a method for specifically determining the difference between two physical characteristics produced by two operations in heat treatment is the difference between a commercially impracticable and a commercially practicable application of magnetic analysis.

Objects.

It is the primary object of my invention, therefore, to provide a method and means for magnetically determining a plurality of physical characteristics of a specimen when all of such characteristics are unknown. It is a more specific object of my invention to provide a method and means for determining the physical characteristics of a specimen which are produced by the temperatures at which such specimen has been respectively quenched and drawn, when neither the drawing temperature nor the quenching temperature are known.

It is a further object to provide means for positively making a determination in a specimen or a comparative determination in two specimens of a single physical characteristic, such determination being uninfluenced by other physical characteristics.

The invention further contemplates the provision of means which will enable an unskilled operative to accomplish the objects set forth in the two immediately preceding paragraphs, or in other words, to provide an automatic apparatus for commercially carrying out the process.

Drawings.

Figure 2:
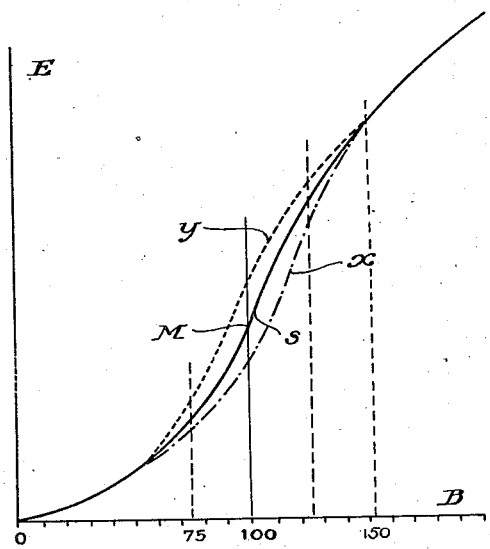
Figure 3:
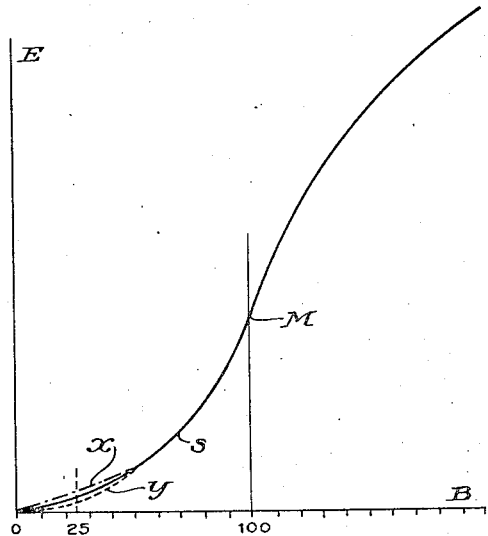
Figure 4:
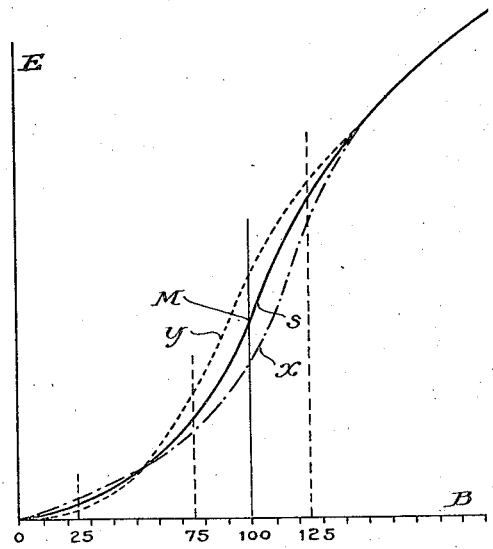
Figure 5:
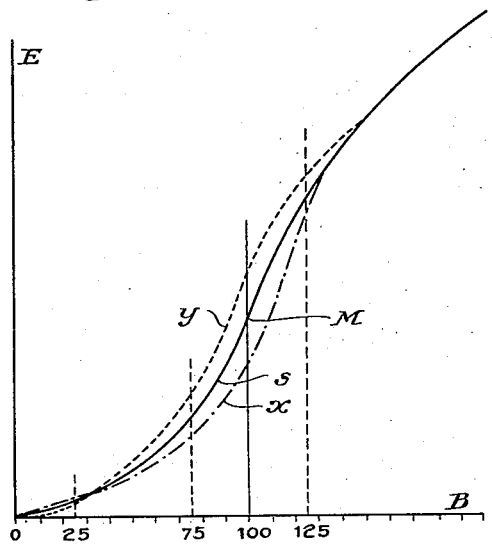
Figure 6:
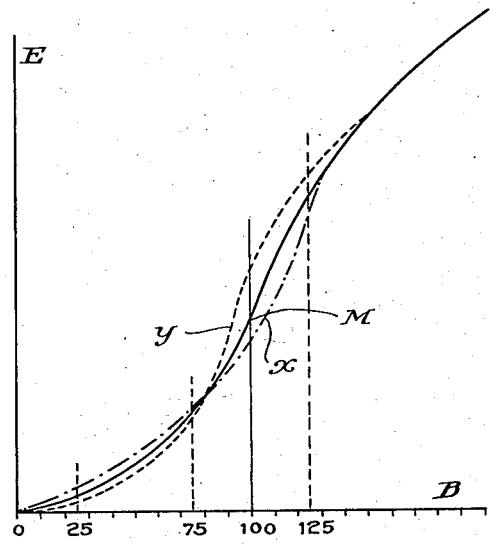
Figure 7:
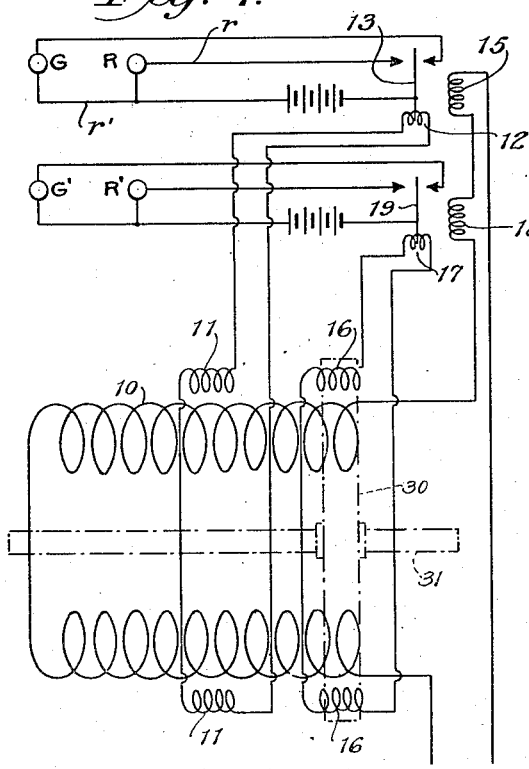
Figure 8:
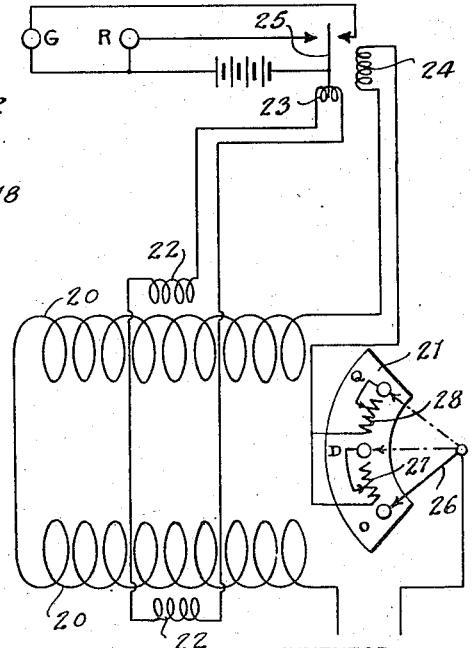

In the accompanying drawings:

Fig. 1 is a graphic illustration of a normal induction curve of a specimen which may be selected as standard, Fig. 2 illustrates graphically the hysteresis energy curves of a number of specimens differing from each other in quenching temperatures, Fig. 3 is a view similar to Fig. 2, showing the curves of specimens differing from each other only in drawing temperature, Figs. 4, 5, and 6 are similar views, indicating the hysteresis energy curves of various sets of specimens which differ from each other in both quenching and drawing temperature, Fig. 7 is a diagrammatic view of apparatus for carrying out my improved method, and Fig. 8 is a diagrammatic view of a slightly modified form of apparatus.

Theory.

Before proceeding to describe in detail my improved method and means for testing magnetizable objects, it may be well to outline generally the nature of the discovery which I have made, and explain the theory of the apparatus which I have invented for applying the new principles involved to the magnetic testing of ferrous metals.

The theory may be best understood by referring to Figures 1 to 6 of the drawings. In all of the experiments and in fact in all of the actual tests, it is necessary to select some specimen as a standard. The characteristics of this specimen are compared either directly or indirectly with the characteristics of specimens to be tested, and it is thus determined whether the characteristics of the specimens undergoing test vary to a fatal extent from those of the standard. The selection of a standard is entirely arbitrary, since testing may be done to any standard selected.

Assuming that a standard has been selected, Fig. 1 illustrates graphically the normal induction curve of such standard or at least the portion of such curve which is of interest. Units of magnetizing force or strength of the magnetic field on the line B are plotted against induction on the line H. It will be noted that there is a portion of the induction curve where the induction increases very greatly per unit of magnetizing force. The steepest point of the curve is within this portion and is known as the point of maximum differential permeability. This point is indicated by the letter M. On the line B of Fig. 1, we have indicated the magnetizing force in terms of percentage, arbitrarily using 100% as the amount of magnetizing force necessary to reach the point of maximum differential permeability in the standard. This point is of considerable importance in determining the relative intensities of the fields necessary for distinguishing various physical characteristics of the specimen, and has been indicated in Figures 2 to 6 inclusive by a similar reference character.

In these figures, the curves shown are not induction curves, but hysteresis energy curves, and magnetizing force on the line B is plotted against hysteresis energy on the line E. In every case, the curve of the standard specimen is indicated at $s$ and the curves of the unknown specimens by $x$ and $y$ respectively. In terms of units of magnetizing force, that force necessary to reach the point of maximum differential permeability in the standard specimen may be readily located on the line B of Figs. 2 to 6, and as in Fig. 1, the magnetizing force has been indicated in terms of percentage, using 100% as the force necessary to reach maximum differential permeability. It will be readily understood that the hysteresis energy curves differ from the normal induction curve in that they represent graphically the areas of the successive hysteresis loops while the induction curve is merely the common locus of the peaks of such loops. The induction curve is introduced merely to show the method of locating the point of maximum differential permeability.

In Fig. 2, are shown the curves $x$ and $y$ of two non-standard specimens differing from the standard only in the temperatures at which they have been quenched, one having been quenched at a higher and one at a lower temperature than the standard. It is to be noted that the difference between the three curves is most clearly distinguishable at or near the point of maximum differential permeability, and that the curves are substantially coincident all through the threshold values of the fields and with values above 150% of the value of the maximum differential permeability.

In Fig. 3, we have shown the curves $s$, $x$, and $y$ of the standard specimen and two non-standard specimens differing therefrom only in the temperatures at which they have been drawn. In this figure, we note that the curves are coincident except at points close to the threshold values of the magnetizing field.

In Figs. 4, 5, and 6, we have shown the curve $s$ of the standard and the curves $x$ and $y$ of various non-standard specimens which differ from the standard in both quenching and drawing temperatures. In all of these curves, it is notable that a difference in quenching temperature is most apparent in the region of the point of maximum differential permeability, and the differences in drawing temperature are most marked in the region of the threshold or low values of the magnetizing force. It is also of interest to note that the curves of specimens differing from each other both in respect to quenching and drawing temperatures, will always intersect at a point between 25% and 75% of the value of the force necessary to produce maximum differential permeability.

As a result of experiments extending over a period of years, we have made the following discoveries:

1—That the greatest percentage variation in the hysteresis energy curve of two specimens differing from each other merely in the physical characteristic produced by quenching temperature may always be found approximately close to the point of maximum differential premeability.

2—That the greatest percentage variations in the hysteresis energy curves of two specimens differing from each other only in the characteristic produced by drawing temperature may be found in the threshold values of the magnetizing force.

3—That where two specimens differ from each other in the characteristics produced by both quenching and drawing temperatures, variations in the curves between 75% and 125% of the magnetizing force necessary to reach the point of maximum differential premeability are indicative solely of variations in physical characteristics produced by quenching temperature.

4—That when two specimens differ from each other in the characteristics produced by both quenching and drawing temperatures, variations in the curves between zero and a magnetizing force of 75% of that necessary to reach a point of maximum differential premeability are indicative solely of differences in physical characteristics produced by differences in drawing temperatures.

5—That where two specimens differ from each other in the characteristics produced both by quenching and drawing temperatures, the hysteresis energy curves of such specimens intersect at a point between 25% and 75% of the magnetizing force necessary to reach the point of maximum differential permeability in one of the specimens.

In considering these discoveries, it is well to note carefully that differences in both quenching and drawing temperatures may sometimes be located at points on the curve between the ranges set forth. It is only within these ranges, however, that one may know with absolute certainty whether he is detecting a difference in a single definite characteristic. Since the curves are likely to intersect at any point between 25 and 75%, this range is dangerous ground for conducting experiments as is any value above 125% of the force necessary to produce maximum differential premeability. For instance, if we use a magnetizing force of 50% to test the specimens of Figs. 4, 5, and 6 respectively, we would in Fig. 4 detect no difference; in Fig. 5, get a difference due to quenching temperature, and in Fig. 6, a difference due to drawing temperature. Since most of the specimens to be tested differ in both of these characteristics, the only accurate procedure to follow is to test within the ranges specified to get an accurate indication of differences in either specific characteristic.

*Apparatus.*

Understanding the new principles discovered, a thorough understanding may be readily had of the apparatus for carrying out the invention and its method of operation.

Referring with particularity to Fig. 7 of the drawings, I have illustrated an apparatus which comprises a pair of similar primary or field producing coils 10, connected in series to a common source of alternating current and adapted to produce separate magnetic fields of equal intensity. At the points of maximum intensity in the respective fields, I have located secondary exploring coils 11, 11. These coils are connected together in series and in opposition to each other and form with the potential coil 12 of a dynamometer, a closed secondary circuit. Preferably, the potential coil 12 is the moving coil of the instrument and carries a pointer 13 adapted to close one or the other of a pair of signal circuits r r' for rendering operative one or the other of a pair of visible signals G, R. In using the apparatus, a standard specimen is placed in one of the coils 10, and the specimen to be tested is placed within the other coil 10. The coils 11, 11 are sensitive to energy expended in the magnetic fields produced by the primary coils 10, 10. In other words, each coil 11 is sensitive to the magnetic effect caused by the presence of a specimen in one of the fields. Since the two coils 11 are connected in opposition, the pointer 13 will be actuated only when the standard and unknown specimens produce different magnetic effects on the coils, 11, 11. The primary coil 15 of the instrument of which coil 12 forms a part is preferably in series with the field producing coils 10, 10, forming a part of the primary or energizing circuit.

The apparatus above described may be considered as the means for comparing the quenching temperatures of a standard and unknown specimen. The intensity of the field produced by the coils 10 is within the specified range of 75% to 125% of the magnetizing force necessary to reach the point of maximum differential permeability in the standard.

Attention is particularly directed to the fact that the pointer 13 does not operate one of the signal lights, unless the specimen to be tested varies from standard to what may be termed a fatal extent. In other words, if the specimen undergoing test has been quenched at a prohibitively high temperature, the pointer 13 by closing a signal circuit will flash the light G. If the specimen undergoing test has been quenched at a prohibitively low temperature, the pointer 13 will close a signal circuit and flash a light R. Ordinarily, red and green lamps are used for this purpose, but any visible or audible signals might be operated. If it is desirable, a third signal such as a white light may be used to indicate that a specimen conforms approximately to the standard or is of a character which will permit it to be used for the purpose intended.

The magnetic field produced by the two energizing coils 10, 10 is of greatest intensity adjacent the coils 11, and at its lowest intensity near the ends of the coils 10, 10. In fact, a point may be found at or near the ends of the coils 10, 10, where the intensities of the magnetizing fields are at their threshold values or at an intensity less than 25% of the values necessary to reach the point of maximum differential permeability in the standard.

It being desirable to compare simultaneously the characteristics produced in the unknown specimen both by quenching and drawing temperatures, I have located a second pair of exploring coils 16, 16 near the ends of the coils 10, 10. Coils 16 are connected in series and in opposition to each other forming a closed circuit with the moving coil 17 of a dynamometer, the stationary coil 18 of such dynamometer being in series with the primary or energizing circuit. A pointer 19 carried by the coil 17 controls in like manner to the pointer 13, a second pair of signal lamps. Since the opposed coils 16 are located at points in the fields of the coils 10, 10, where the magnetizing force is at its threshold value, the lamps G′ R′ controlled by the pointer 19 will be indicative of fatal variations in that characteristic produced by drawing temperature, while the lamps G, R, controlled by the pointer 13 will indicate fatal variation in the characteristic produced by quenching temperature.

For testing purposes, it is merely necessary to insert a standard specimen and a specimen to be tested within the respective coils 10. As the energizing current is thrown on, the signal lamps G, R, and G′, R′ will simultaneously indicate a variation from standard in respect to a characteristic produced by either drawing or quenching temperatures. The lamps are of course independently operable to indicate a variation in respect to one of these characteristics or to indicate a variation in respect to both characteristics.

With the commercial form of apparatus, the two coils 16 are arranged on a support 30 slidable on a rod 31 as diagrammatically shown for adjustment relative to the coil 10, so that they may be moved to the point where the fields are of the proper intensity for comparing the characteristics of the specimen produced by drawing temperature.

In Fig. 8, I have illustrated another form of testing apparatus designed not for simultaneously testing the characteristic produced by both drawing and quenching temperatures, but for optionally testing either of such characteristics. This form of apparatus includes primary coils 20, 20 adapted to produce magnetic fields of equal intensity. The coils are energized from any suitable source of alternating current and a rheostat 21 in circuit with the coils controls the intensity of the fields which they produce. Secondary exploring coils 22 form a closed circuit with the moving coil 23 of a dynamometer, the secondary coils being connected in series and in opposition with each other. The stationary coil 24 of the dynamometer forms part of the primary circuit. A pointer 25 carried by the moving coil 23 is adapted for closing either of a pair of signal circuits. The arm 26 of the rheostat 21 is adapted to make contact at three different points on the board of the instrument, these contact points being indicated respectively at O, D and Q. When the arm is at O, no current passes through the coils 20. When the arm 26 is moved to the contact point D, sufficient current is passed through the coils 20 to produce that field intensity desirable for testing physical characteristics of the specimens caused by drawing temperature. This exact intensity will of course vary with the chemical analyses of the various sets of specimens which may be tested, and to insure accurate results, a variable resistance 27 is introduced between the contact points O and D. As the arm 26 is swung to the point Q, sufficient current passes through the coils 20 for producing a field of suitable intensity for testing the characteristic of the unknown specimen resulting from quenching temperature.

A second variable resistance 28 may be introduced in the rheostat between the contact point D and Q for the same purpose as the variable resistance 27. The operation of the apparatus shown in Fig. 8 is the same as the operation of the apparatus shown in Fig. 7, the only difference being that the same testing coils 22 may be optionally used for determining the characteristic produced by either quenching or drawing temperature. The selection of the characteristic to be tested is automatically accomplished by moving the rheostat arm 26 to the point D or the point Q on the rheostat board.

The foregoing description of the apparatus has made it apparent that I have designed means for automatically utilizing the discoveries which I have made and described above. The method involved consists principally in producing a varying magnetic field about the specimen to be tested, maintaining the maximum intensity of the field within defined and predetermined limits and using exploring means sensitive to the magnetic effect of the specimen within the field. For commercially carrying out the method, I also find it desirable to use some positive indicating means such as the signal lamps, which will permit the testing to be done by an unskilled operative.

The apparatus which I have shown is adapted for comparative testing. In other words, the specimen to be tested is directly compared with the standard. It will be obvious, however, that the method might be carried out by an indirect comparison method; in other words, by the use of a single primary coil, a single secondary coil, and an indicating instrument which is inoperative when a standard specimen is in place. In the specification, I have also referred to the use of alternating current for producing the field. It may be noted that the use of alternating or reversing current is not essential. It is only essential that a varying field be used inasmuch as energy is the quantity to be indicated.

A great variety of apparatus might be designed for carrying out the method of testing which I have described and it will be apparent that I do not wish to limit myself to the use of the apparatus set forth, but shall consider myself at liberty to utilize any suitable means, either automatic or otherwise, for carrying out the process set forth in the appended claims.

I claim:

1. A method of simultaneously determining two physical chacteristics of a magnetizable object which consists in placing the object in a varying magnetic field, placing separate exploring means in parts of the field that differ in intensity, and noting the magnetic effect of such object upon such exploring means.

2. A method of simultaneously determining two physical characteristics of a magnetizable object which consists in producing a magnetic field about the object, placing a pair of exploring coils in parts of the field of different intensity, and indicating through the intermediacy of the exploring coils the magnetic effect of the objects upon such coils.

3. A method of simultaneously determining two physical characteristics of a magnetizable object which consists in producing a magnetic field about the object, maintaining the maximum intensity of the field within defined limits, placing independent exploring coils in parts of the field that differ in intensity, and noting the magnetic effects of the object upon the exploring coils.

4. A method of simultaneously determining two physical characteristics of a magnetizable object which consists in producing a varying magnetic field about the object, placing test coils in parts of the field that differ in intensity and operating hysteresis energy sensitive indicating means through the intermediacy of said coils.

5. A method of simultaneously determining two physical characteristics of a magnetizable object which consists in placing such object and a standard object in similar varying magnetic fields, maintaing the maximum intensity of such fields within defined limits, placing a pair of exploring means in similar positions in each field, one member of each pair being located in a part of the field which has a different intensity from that in which the other member of the pair is located, and comparing the magnetic effect of the first named object with the magnetic effect of the standard object upon the similarly located exploring means in the two fields.

6. A method of simultaneously determining two physical characteristics of a magnetizable object which consists in placing such object and a standard object in similar alternating magnetic fields, maintaining the maximum intensity of such fields within defined limits, placing two exploring means in similar positions in each field, one of the exploring means in each field being located in a part of the field which is of different intensity from that in which the other exploring means is located, and comparatively indicating by energy sensitive instruments, the magnetic effect of the object upon the similarly located exploring means in the two fields.

7. A method of determining a physical characteristic of a magnetizable object resulting from the temperature at which said object is drawn, which method consists in producing a varying magnetic field about the object, maintaining the maximum intensity of the field at a value which is less than 26% of the value required to reach the point of maximum differential permeability in said object, placing a test coil in the field, and noting the magnetic effect of said object on said test coil.

8. A method of determining a physical characteristic of a magnetizable object resulting from the temperature at which said object was drawn, which method consists in placing said object in an alternating magnetic field, maintaining said field at a comparatively low intensity or threshold value, placing a test coil in the field, and noting the magnetic effect of the object on the test coil.

9. A method of determining that physical characteristic of a magnetizable object, resulting from drawing temperature which consists in placing said object in an alternating magnetic field, maintaining said field at a comparatively low intensity or threshold value, placing a test coil in the field, and noting the effect on the test coil of the energy consumed by the object.

10. A method of determining that physical characteristic of a magnetizable object which is the result of the temperature at which said object is drawn, which method consists in producing similar varying magnetic fields about the object to be tested and a standard object, maintaining such fields at a low intensity or threshold value, placing test coils in the respective fields, and comparing the magnetic effects of the standard and unknown specimens on the test coils.

11. A method of determining that physical characteristic of a magnetizable object which is the result of the temperature at which said object was drawn, which method consists in producing similar varying magnetic fields about the object to be tested and a standard object, maintaining such fields at a maximum intensity less than 26% of the intensity necessary to reach the point of maximum differential permeability in the standard object, placing test coils in the respective fields, and comparing the magnetic effects of the standard and unknown specimens on the test coils.

12. The method as set forth in claim 11 wherein the final step consists in indicating the differential of the magnetic effects of the objects on the test coils.

13. The method as set forth in claim 11 wherein the final step consists in indicating the differential of the hysteresis energy consumed by the objects is indicated.

14. A method of determining that physical characteristic of a magnetizable object which is the result of the temperature at which said object was quenched, which method consists in producing a varying magnetic field about said object, maintaining said field at an intensity closely approximating the intensity necessary to reach the point of maximum differential permeability in said object, placing a test coil in the field, and noting the magnetic effect of the object on the test coil.

15. The method as set forth in claim 14 wherein the final step consists in indicating through the intermediacy of the test coil the hysteresis energy consumed by the object.

16. A method of determining that physical characteristic of a magnetizable object which is the result of quenching temperature which method consists in producing a varying magnetic field about said object, maintaining the maximum intensity of such field within defined limits between which can be found the intensity necessary to reach the point of maximum differential permeability in said object, said limits being located on each side of such point a distance equivalent to about one-fourth of the total intensity necessary to reach such point, placing a test coil in the field, and noting the magnetic effect of the object on the test coil.

17. The method as set forth in claim 16 wherein the final step consists in noting the hysteresis energy absorbed by the object.

18. A method of determining that physical characteristic of a magnetizable object which is the result of the temperature at which such object was quenched which method consists in producing similar varying magnetic fields about the object to be tested and a standard object, maintaining said fields at an intensity approximating the intensity necessary to reach the point of maximum differential permeability in the standard object, placing exploring coils in the respective fields, and comparing the magnetic effects of the two specimens on the two exploring coils.

19. A method of determining that physical characteristic of a magnetizable object which is the result of quenching temperature, which method consists in producing similar varying magnetic fields about the object to be tested and a standard object, maintaining said fields at a maximum intensity within twenty-five percent above and below the intensity necessary to reach the point of maximum differential permeability in the standard object, placing exploring coils in the respective fields, and indicating the differential of the magnetic effect of said objects on the exploring coils.

20. The method as set forth in claim 19 wherein the final step consists in indicating the differential of the hysteresis energy consumed by the objects.

21. A method of simultaneously determining two physical characteristics of a magnetizable object which consists in producing a varying magnetic field about the object to be tested, placing a test coil in said field adjacent the point of greatest intensity, placing a second test coil in the field, and shifting the same to a point in the field where the intensity thereof is close to its threshold value, and noting the magnetic effect of the specimen upon the test coil.

22. The method as set forth in claim 21 wherein the final step consists in noting the hysteresis energy consumed by the object.

23. A method of simultaneously determining two physical characteristics of a magnetizable object, which consists in placing the object in a varying magnetic field, noting the magnetic effect of the object upon a test coil located in said field adjacent the point of greatest field intensity, and noting the magnetic effect of the specimen upon a second test coil located in the field at the point where the field intensity is close to its threshold value.

24. A method of simultaneously determining two physical characteristics of a magnetizable object which consists in producing similar varying magnetic fields about such object and a standard specimen, placing test coils in the respective fields adjacent the point of greatest intensity, placing other test coils in the respective fields, simultaneously shifting the last mentioned test coils to a point in the field where the intensity thereof is close to its threshold value, and indicating the differential of the magnetic effect of the object and the specimen upon the test coils.

25. The method as set forth in claim 24 wherein the final step consists in indicating the differential of the hysteresis energy consumed by the object and the specimen respectively.

26. A method of simultaneously determining two physical characteristics of a magnetizable object which consists in producing a varying magnetic field about the object to be tested, maintaining the field at an intensity closely approximating the intensity necessary to reach the point of maximum differential permeability in the standard object, placing two sets of test coils in each field, and comparing the magnetic effect of the specimen upon the similarly located coils in the two fields 27. A method of simultaneously determining two physical characteristics of a magnetizable object which consists in producing a varying magnetic field about the object to be tested, maintaining the field at an intensity approximating that necessary to reach the point of maximum differential permeability in a standard object, placing a pair of similarly located test coils in each field, one coil of the pair being placed in that part of the field having the greatest magnetic intensity and the other in that part of the field which has less than twenty-six percent of the maximum intensity, and noting the magnetic effect of the object upon each coil.

28. The method as set forth in claim 27 wherein the final step consists in indicating through the intermediacy of the two coils the hysteresis energy consumed by the object.

29. Apparatus for testing the physical properties of a specimen including means for producing a varying magnetic field about the specimen, and a pair of independent exploring devices in the field located in parts of the field that differ in magnetic intensity.

30. In an apparatus for testing the physical properties of magnetizable objects, means for producing a magnetic field about the object, and separate means sensitive to the magnetic effect of the field on the object for simultaneously and independently indicating two physical characteristics of such object.

31. Apparatus for testing magnetizable objects including means for producing a field about the object to be tested, and test coils in different parts of the field each sensitive to a magnetic effect of the field on the object which is indicative of a different physical characteristic of the object.

32. In an apparatus for testing the physical properties of magnetizable objects, means for producing a magnetic field about the object, separate exploring means respectively sensitive to the magnetic effect of the field on the object produced by two separate physical characteristics of the object, and means for shifting one of said exploring means relative to the other.

33. In an apparatus for testing the physical properties of magnetizable objects, means for producing a pair of magnetic fields of equal intensity about the object to be tested and a standard object, pairs of test coils in the respective fields, one test coil in each field being sensitive to a magnetic effect on the object produced by a single physical characteristic of the object, a test coil in one of the fields being connected to a test coil in the other field for simultaneous shifting movement relative to the other pair of test coils.

34. Apparatus for testing the physical properties of magnetizable objects including a pair of primary coils for producing similar magnetic fields about the object to be tested and a standard object, a pair of test coils in the respective fields connected in opposition to an indicating instrument, a second pair of test coils in the respective fields connected in opposition to a second indicating instrument, and means for effecting relative movement of the two pairs of test coils.

35. In an apparatus for testing the physical properties of magnetizable objects, means for producing magnetic fields of equal intensity about an object to be tested and a standard specimen respectively, a pair of test coils in each field, one test coil in each field being located at a point of maximum intensity of the field and the other test coil in each field being located at a point of lower magnetic intensity of the field, similarly located coils in the two fields being connected in opposition to each other and in series with an indicating instrument.

36. In an apparatus for testing the physical properties of magnetizable objects, means for producing magnetic fields of equal intensity about the object to be tested and a standard specimen respectively, a pair of test coils in each field, one test coil in each field being located in a position in which it is sensitive to a magnetic effect produced by a single physical characteristic of the object, the other test coil in each field being mounted for movement relative to the first test coil.

In testimony whereof, CHARLES W. BURROWS has signed his name to this specification this third day of January, 1924.

CHARLES W. BURROWS.